UNITED STATES PATENT OFFICE.

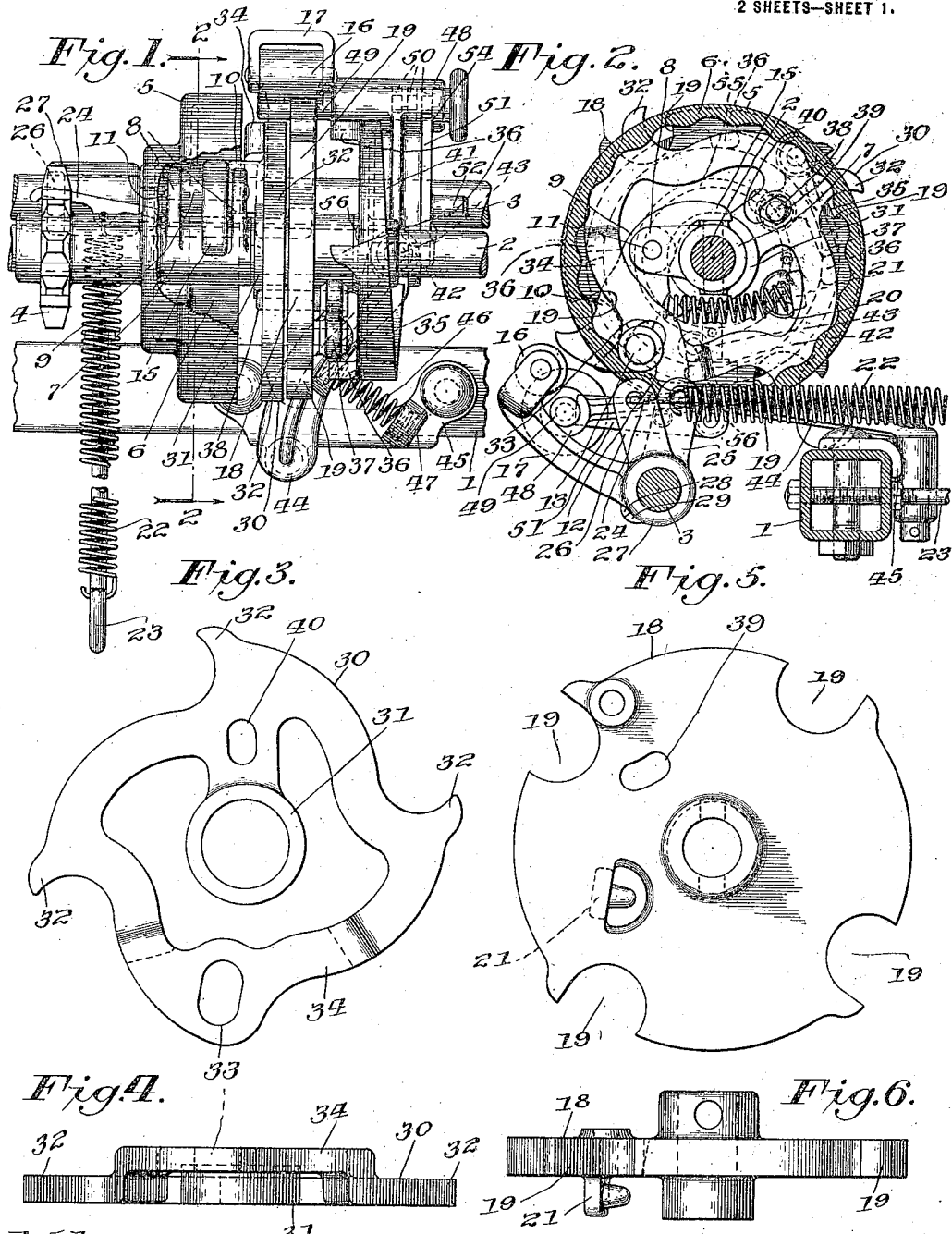
E. W. BURGESS.
CLUTCH FOR CORN PLANTERS.
APPLICATION FILED JULY 13, 1914.
1,247,075.
Patented Nov. 20, 1917.
2 SHEETS—SHEET 1.

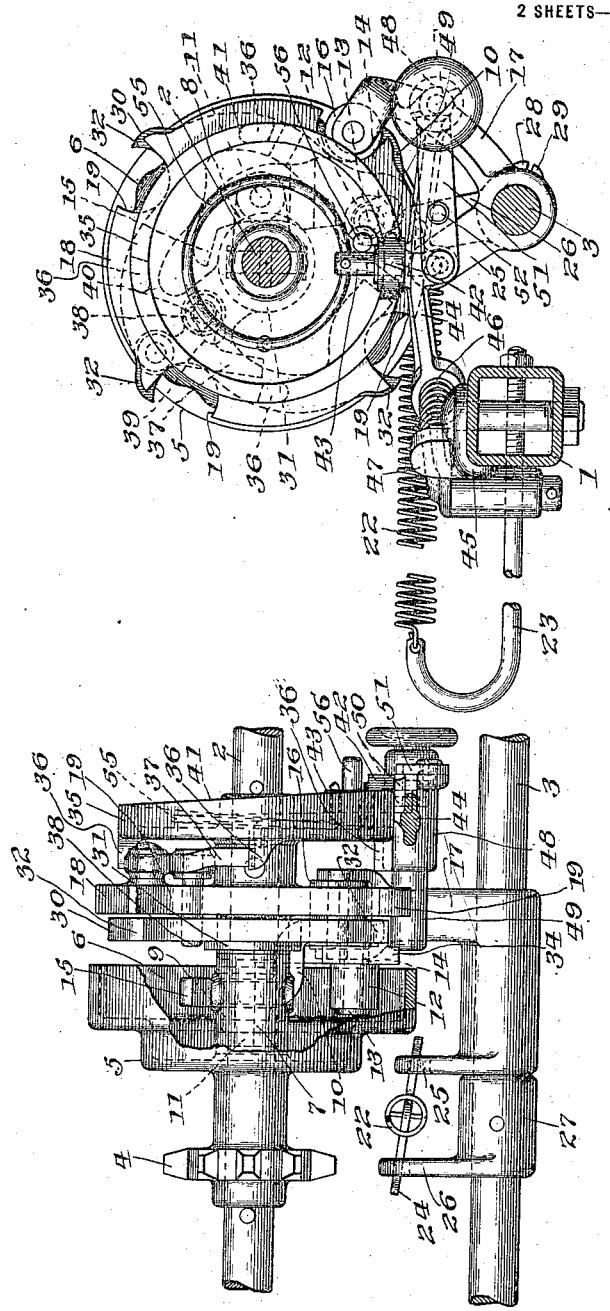

EDWARD W. BURGESS, OF CHICAGO, ILLINOIS, ASSIGNOR TO INTERNATIONAL HARVESTER CORPORATION, A CORPORATION OF NEW JERSEY.

CLUTCH FOR CORN-PLANTERS.

1,247,075.  Specification of Letters Patent.  Patented Nov. 20, 1917.

Application filed July 13, 1914. Serial No. 850,605.

*To all whom it may concern:*

Be it known that I, EDWARD W. BURGESS, a citizen of the United States, residing at Chicago, in the county of Cook and State of Illinois, have invented certain new and useful Improvements in Clutches for Corn-Planters, of which the following is a full, clear, and exact specification.

My invention relates to corn planters, and in particular to an improved form of clutch mechanism forming part of the associated mechanical elements that are operative to control the seed dropping means, and consists in an intermittently operating clutch mechanism connected with the feed shaft of a planter in a manner to transmit rotary movement thereto through its connection with the traction wheels when tripped into action automatically by means of a check wire operative in a common way or otherwise, and to means connected with the clutch tripping mechanism and operative to vary the degree of angular movement of the feed shaft whereby a variable number of kernels of corn may be dropped by the seed delivering mechanism connected with the seed shaft.

The objects of my invention are to provide an improved clutch mechanism for the purpose indicated that will be positive in its operation, and one that may be readily adjusted to vary the number of kernels delivered, and not liable to become disarranged or inoperative.

These objects are attained by means of mechanism one embodiment of which is illustrated in the accompanying drawings, in which—

Figure 1 is a top plan view of a clutch mechanism embodying my invention and connected with other operative parts of a corn planter;

Fig. 2 is a vertical section of Fig. 1 along line 2—2;

Fig. 3 is a top plan view of a detail part of the clutch controlling mechanism;

Fig. 4 is a side elevation of the part shown in Fig. 3;

Fig. 5 is a plan view of a fixed part of the clutch mechanism;

Fig. 6 is a side view of the part shown in Fig. 5;

Fig. 7 is a front elevation of part of the clutch mechanism and showing a part of a corn planter mechanism associated therewith; and Fig. 8 is an end elevation of the mechanism shown in Fig. 7 and part of the frame structure of a corn planter.

Referring to the drawings, wherein the same reference numerals designate like parts throughout the several views, 1 represents a transverse member of the runner frame of a corn planter, 2 the feed shaft, and 3 the valve controlling and clutch tripping rock shaft that may be operatively connected with a check wire mechanism (not shown). Journaled upon the shaft 2 is a combined sprocket wheel 4 and clutch member 5, having an internal toothed rim 6 common in clutch mechanism and adapted to receive continuous rotation from a movable part of the planter mechanism. 7 represents a sleeve secured to the feed shaft 2 and having laterally extending ear members 8 spaced apart and receiving between them a barrel member 9 forming part of a clutch pawl 10, the barrel being journaled upon a pin 11 received by the ears and having its axis parallel with the axis of the feed shaft. The clutch pawl 10 carries a roller 12 that is journaled upon a stud 13 secured to the pawl, and 14 represents a laterally extending boss integral with the pawl and receiving the stud and disposed between the roller and the face of the pawl. The roller is adapted to engage with the teeth upon the rim 6 of the constantly rotatable clutch member 5 when the pawl is rocked in one direction, and to be released therefrom when the pawl is rocked in an opposite direction. The pawl is provided with a tail member 15 that is adapted to engage with the sleeve 7 when the roller 12 engages with the clutch teeth of the rim 6, and thereby cause the sleeve and shaft to rotote with the clutch member 5. The clutch pawl 10 extends radially outward and is offset laterally from the roller 12 and is adapted to engage with a roller 16 carried by a clutch tripping arm 17 journaled upon the shaft 3. 18 represents a disk secured to the feed shaft 2 adjacent the sleeve, and having notches 19 in its periphery that receive the roller 16 when it is moved to a position to engage with the clutch pawl 10 and disengage it from the toothed rim 6, the pawl being normally moved in a direction to engage with the rim 6 by means of a compression spring 20 operative between an ear member 21 upon the side of the disk 18 and the pawl. The shaft 3 and the arm 17 are rocked in a direction to raise the roller 16 to engage with the pawl 10 by means including a tension spring 22, having one end connected with a rod 23 that is adjusted longitudinally upon the frame member 1, the opposite end of the spring being connected with an equalizing bar 24, having one end received by an opening in the ear 25 integral with the hub of the arm 17, and its opposite end by an opening in an arm 26, having a hub 27 secured to the clutch tripping shaft 3. Secured to the hub 27 is a laterally turned tooth 28 adapted to engage with a corresponding tooth 29 carried by the hub of the arm 17 in a manner to cause the arm 17 to rock in a direction to trip the clutch mechanism into action when the tripping rock shaft is actuated, by means of a check wire or otherwise, and the equalizing bar 24 will permit a limited independent movement of the two arms 17 and 26 in an opposite direction when the shaft 3 is released from control of the check wire.

The operation of the clutch as described above is well known in the art, wherein an intermittent predetermined movement of the mechanism is required at each actuation thereof. In corn planters it is required to vary the number of kernels delivered at each actuation of the seed dropping mechanism, which may be two, three, or four, and this has been accomplished by means of changeable parts of the mechanism, as the seed plates, or by providing a secondary clutch mechanism that is actuated by the primary clutch, and means for varying the movement of the secondary clutch in a manner whereby the feed shaft is given more or less of an angular movement at each actuation of the clutch mechanism, the degree of angular movement being controlled at the will of the operator. My invention includes means whereby a single primary clutch mechanism may be controlled in a manner to cause a variable degree of angular movement of the feed shaft of a corn planter when actuated by the clutch mechanism. For this purpose the disk 18 is provided with notches 19 upon its periphery, preferably four in number, and spaced 90° apart, thus providing four notches at equal distances apart upon the disk, either of which may receive the roller 16 journaled upon the tripping arm 17. 30 represents a pawl controlling member having a hub 31 whereby it is journaled upon the end of the sleeve 7, between the disk 18 and the clutch rim 6, and hook members 32 corresponding in form and position with the outwardly extending end of the pawl 10 relative to the notches 19. The pawl controlling member is provided with a radially disposed slot 33 in a laterally offset part 34 that receives the boss 14 of the pawl 10, the hook members 32 being disposed in the same vertical plane as the extended end of the pawl 10. 35 represents a disk journaled upon the feed shaft 2 adjacent the hub of the disk 18, and provided with laterally extending teeth 36 upon its inner side, with which a pawl 37 is adapted to engage, the pawl being pivotally mounted upon the disk 18 and controlled by means of a pin 38 secured to the pawl and received by a concentric slotted opening 39 in the disk 18 and a radially disposed slotted opening 40 in the pawl controlling member 30. The disk 35 is provided upon its opposite side with a circumferential faced cam 41, having preferably a rise of approximately ⅜ of an inch in its length and designed to engage with a roller 42 journaled upon a stud 43 carried by a horizontally disposed vibratile arm 44 pivotally mounted upon a bracket member 45 secured to the frame member 1; the roller 42 being yieldingly held in engagement with the cam 41 by means of a compression spring 46 operative between an ear member 47 integral with the bracket 45 and the arm 44. The arm 44 is extended beyond the roller 42, above the shaft 3, and carries at its other end a laterally disposed barrel member 48 that adjustably receives a bolt 49 having a series of spaced annular grooves 50 that may selectively receive the free end of a latch member 51 pivoted upon the arm 44 and having a laterally extended stud 52 whereby the latch may be controlled, the free end of the latch entering a slot 54 in the barrel member when engaging with the bolt and securing it against lateral displacement. When the arm 17 carrying the roller 16 is in the position shown in Fig. 8 the pawl 10 is held disengaged from the clutch rim 6 and the bolt 49 engages with the side of the arm 17, holding the arm 44 against the force of the spring 46, and the feed shaft 2 of the corn planter is at rest. When the clutch tripping shaft 3 is rocked by the check wire the roller 16 is carried from engagement with the pawl 10 and the arm 17 from the bolt 49, and the arm 44 carries the roller 42 into engagement with the cam 41 and the bolt 49 within the path of return movement of the arm 17 as the shaft 3 is released from the control of the check wire. When the pawl 10 is released from the roller 16 it is thrown into engagement with the clutch rim 6 by the reactive force of the spring 20 and rocks the pawl controlling member 30 about its axis, thereby swinging the pawl 37 into engagement with the tooth 36 upon the disk 35. The disk 35 rotates with the pawl 10, the disk 18 and the feed shaft 2. The disk 35 rotates against the force of a clock-like spring 55, having one end connected with the disk and its opposite end with a vertically extended end of the stud 43 carrying the roller 42, and 56 represents a laterally disposed stop pin carried by the disk 35 and engaging with the stud 43 when the disk is at rest. The cam 41 engaging with the roller 42 swings the arm 44 about its axis and the bolt 49 is carried away from the path of the arm 17 and the arm carries the roller 16 into engagement with the pawl 10 and disengages the clutch mechanism. The pawl 10 swings the pawl controlling member 30 about its axis, thereby disengaging the pawl 37 from the tooth 36 upon the disk 35, and the disk is returned to its initial position with the stop pin 56 engaging with the stud 43 by the reactive force of the spring 55, and the cycle of movement of the clutch parts is completed, with the feed shaft at rest until the clutch is again tripped into action.

The clutch mechanism as shown is designed for use in connection with a corn planter having the seed delivering mechanism so constructed and operated as to deliver the maximum number of kernels, preferably four, when the feed shaft is given one complete revolution at each actuation thereof by the clutch mechanism; three kernels if the shaft is given three-quarters of a revolution; two kernels if the shaft be given one-half of a revolution, and one kernel if the shaft be given one-fourth of a revolution. The function of the bolt 49 is to hold the arm 17 after it has been actuated by the check wire away from the pawl 10 while the clutch mechanism is rotating the feed shaft 2 through a predetermined degree of angular movement, and such degree is determined by the degree of movement imparted to the arm 44 by the cam 41 and required to swing the bolt 49 away from the path of movement of the arm 17 to permit the roller 16 to engage the clutch mechanism. If the bolt 49 be adjusted to its limit of movement toward the arm 17, as shown in Fig. 7, it will require a complete revolution of the disk 35 to cause the cam 41 to swing the arm 44 a sufficient distance to carry the bolt 49 away from the path of movement of the arm 17, which distance may for example be one inch. If, when such a distance is used the bolt be adjusted laterally in the barrel away from the arm 17 one-quarter of an inch, then the shaft would be given $\frac{3}{4}$ of a revolution before the bolt was withdrawn; and if $\frac{1}{2}$ of an inch, then the shaft would be given $\frac{1}{2}$ of a revolution, and if $\frac{3}{4}$ of an inch, then the shaft would be given $\frac{1}{4}$ of a revolution at each cycle of movement of the clutch mechanism. In this manner I have provided means whereby the clutch mechanism may be governed in a manner to cause the seed delivery mechanism to selectively deliver one, two, three, or four kernels of corn at each cycle of movement of the clutch mechanism. Obviously, however, when this adjusting mechanism is set for less than four kernels, the roller 16 will engage with one of the projections 32 on the member 30 instead of with the pawl 10.

Having shown and described a preferred form of my invention, I do not wish that it be confined to the specific construction as shown, it being understood that many minor changes may be made both in form and proportion and shape of parts without departing from the spirit of my invention.

What I claim as my invention, and desire to secure by Letters Patent, is:

1. In a seed planter, an intermittent clutch mechanism including a trip device movable in a fixed plane parallel to the plane of the clutch mechanism, and means for holding said trip device away from the clutch mechanism for variable periods.

2. In a seed planter, an intermittent clutch mechanism including a pivoted trip member movable in a fixed plane, and means for adjustably controlling said trip member and thereby controlling said clutch mechanism.

3. In a seed planter, a shaft, an intermittent clutch mounted thereon, an intermittent clutch mechanism including a trip member movable in a fixed plane transverse to the clutch shaft, and means for controlling said trip member to permit said clutch mechanism to be engaged for variable periods.

4. In a check row seed planter, a clutch mechanism including a trip device movable in a fixed plane parallel to the plane of the clutch mechanism and adapted to be actuated at intermittent periods, and means for controlling the movement of said trip device to cause the clutch mechanism to engage for variable periods.

5. In a seed planter, an intermittent clutch mechanism including a trip member movable in a plane parallel to the plane of rotation of the clutch, means for holding said trip member out of operation, and means for varying the period that said member is held out of operation.

6. A variable clutch mechanism having, in combination, a continuously rotatable clutch element, an intermittently rotatable clutch element coacting therewith including a pawl, a pivoted pawl tripping member movable in a fixed plane and adapted to be engaged by and disengaged from said intermittently rotatable element, and means for controlling the movement of said pawl tripping member for variable periods.

7. A variable clutch mechanism having, in combination, a shaft, a continuously rotatable clutch element mounted on said shaft, a tripping element movable in a fixed plane transverse to said shaft, an intermittently rotatable clutch element coacting therewith and movably engaging said tripping element controlling the engagement of said continuously and intermittently rotatable elements, and means for controlling the movement of said tripping element in a manner to vary the degree of angular movement of said intermittently rotatable clutch element.

8. A clutch mechanism including constantly and intermittently rotatable clutch elements, controlling mechanism therefor including a rotatable member having a single series of depressions therein, a tappet actuated trip normally engageable with said depressions, and means for holding out said trip to skip certain of said depressions.

9. A clutch mechanism including constantly and intermittently rotatable clutch elements, controlling mechanism therefor including a rotatable member having a single series of depressions therein, a tappet actuated trip normally engageable with said depressions, and means for holding out said trip to skip any desired number of said depressions.

10. A clutch mechanism including a constantly rotatable clutch element, an intermittently rotatable clutch element coacting therewith and including a pawl, a clutch tripping element, and means operatively connected with said pawl whereby it may be tripped at varying intervals by said tripping element to permit a whole or a part of a revolution of the intermittently rotatable clutch element.

11. A clutch mechanism including, in combination, a shaft, a constantly rotatable clutch element journaled upon said shaft, a second clutch member secured to said shaft, an interlocking clutch element carried by said second clutch member and adapted to intermittently engage with said constantly rotatable member, a clutch controlling member vibratable about the axis of said shaft and connected with said interlocking element having a single series of depressions therein, and an adjustable trip device adapted to coact with said depressions whereby to vary the degree of angular movement of the second clutch member.

12. A clutch mechanism including, in combination, a shaft, a constantly rotatable clutch element journaled upon said shaft, a second clutch member secured to said shaft, a pawl carried by said second clutch member and adapted to intermittently engage with said constantly rotatable member, a clutch tripping member engageable with said pawl, and a clutch controlling member vibratable about the axis of said shaft and pivotally connected with said pawl and coacting with said clutch tripping member in a manner to vary the extent of angular movement imparted to said shaft.

13. A clutch mechanism including, in combination, a shaft, a constantly rotatable clutch element journaled upon said shaft, a second clutch member secured to said shaft, a pawl pivotally connected with said second clutch member and adapted to intermittently engage with said constantly rotatable clutch member, a clutch tripping member adapted to engage said pawl, a pawl controlling member vibratable about the axis of said shaft and provided with a single series of notches in its periphery, and means controlling the engagement of said tripping member with said notches.

14. A clutch mechanism including a shaft, a constantly rotatable clutch element journaled upon said shaft, an intermittently rotatable clutch element secured to said shaft and carrying a pivoted pawl adapted to engage said constantly rotatable clutch element, a clutch tripping member adapted to engage with said pawl, a pawl controlling member vibratable about the axis of said shaft and operatively connected with said pawl, said controlling member provided with a series of radially disposed spaced clutch tripping elements adapted to engage said clutch tripping member, and means for suspending the operation of said clutch tripping member for varying periods.

15. A clutch mechanism including a shaft, a constantly rotatable clutch element journaled upon said shaft, an intermittently rotatable clutch element secured to said shaft and carrying a pivoted pawl adapted to engage said constantly rotatable clutch element, a movable clutch tripping member adapted to engage with said pawl, a pawl controlling member vibratable about the axis of said shaft and operatively connected with said pawl, said controlling member provided with a series of spaced pawl tripping elements adapted to engage said clutch tripping member, a vibratable arm adapted to suspend movement of said clutch tripping member in one direction, and a cam disk rotatable with said intermittently rotatable clutch element and engaging with said arm.

16. A clutch mechanism including a shaft, a constantly rotatable clutch element journaled upon said shaft, an intermittently rotatable clutch element secured to said shaft and carrying a pivoted pawl adapted to engage said constantly rotatable clutch element, a movable clutch tripping member adapted to engage with said pawl, a pawl controlling member vibratable about the axis of said shaft and operatively connected with said pawl, said controlling member provided with a series of spaced pawl tripping elements adapted to engage said clutch tripping member, a vibratable arm adapted to suspend movement of said clutch tripping member in one direction, a cam disk rotatable with said intermittently rotatable clutch element and engaging with said arm in a manner to swing it in one direction, and a spring operative to move it in an opposite direction.

17. A clutch mechanism including a shaft, a constantly rotatable clutch element journaled upon said shaft, an intermittently rotatable clutch element secured to said shaft and carrying a pivoted pawl adapted to engage said constantly rotatable clutch element, a movable clutch controlling member vibratable about the axis of said shaft and operatively connected with said pawl, said controlling member provided with a series of spaced pawl tripping elements adapted to engage said clutch tripping member, a vibratable arm adapted to suspend movement of said clutch tripping member in one direction, a cam disk rotatable with said intermittently rotatable clutch element and engaging with said arm in a manner to swing it in one direction, and a spring operative to move it in an opposite direction, and a longitudinally adjustable bolt carried by the free end of said arm and adapted to engage with said clutch tripping member.

18. A clutch mechanism including a shaft, a constantly rotatable clutch element journaled upon said shaft, an intermittently rotatable clutch element secured to said shaft and carrying a pivoted pawl adapted to engage said constantly rotatable clutch element, a movable clutch tripping member adapted to engage with said pawl, a pawl controlling member vibratable about the axis of said shaft and operatively connected with said pawl, said controlling member provided with a series of spaced pawl tripping elements adapted to engage said clutch tripping member, a vibratable arm adapted to suspend movement of said clutch tripping member in one direction, a cam disk rotatable with said intermittently rotatable clutch element, and a spring operative to return said cam disk in an opposite direction.

19. A clutch mechanism including a shaft, a constantly rotatable clutch element journaled upon said shaft, an intermittently rotatable clutch element secured to said shaft and carrying a pivoted pawl adapted to engage said constantly rotatable clutch element, a rocking clutch tripping member adapted to engage with said pawl, a pawl controlling member carried by said pawl and vibratable about the axis of said shaft, said controlling member provided with a series of spaced pawl tripping elements adapted to engage said clutch controlling member, a vibratable arm adapted to suspend a rocking movement of said clutch tripping member in one direction, a cam disk journaled upon said shaft, a second pawl carried by said shaft and controlled by said intermittently rotatable clutch element and adapted to engage with said cam disk and rotate it with said shaft in one direction to swing said arm about its axis, a spring operative to return said disk to its initial position, and a longitudinally adjustable bolt carried by the free end of said arm and adapted to engage said rocking clutch tripping member.

In testimony whereof I affix my signature, in the presence of two witnesses.

EDWARD W. BURGESS.

Witnesses:
F. W. HOFFMEISTER,
T. N. DAGGETT.